PREPARATION OF SEMICONDUCTOR MATERIALS

Filed July 15, 1960

Kenneth F. Hulme
John B. Mullin
*Inventors*
By Cushman, Darby & Cushman
*Attorneys*

United States Patent Office 3,144,357 Patented Aug. 11, 1964

3,144,357

PREPARATION OF SEMICONDUCTOR MATERIALS

Kenneth Fraser Hulme and John Brian Mullin, Malvern, England, assignors to National Research Development Corporation, London, England, a British corporation Filed July 15, 1960, Ser. No. 43,199
Claims priority, application Great Britain July 23, 1959
4 Claims. (Cl. 148—1.6)

This invention relates to the preparation of semiconductor materials.

In the preparation of semiconductor materials a more generally used approach is to produce the semiconductor material in as pure a form as possible and then to introduce a known quantity of a given impurity to give a predeterminable, desired concentration in the material.

To obtain the semiconductor material in the very pure form necessary the process of zone refining is used. This involves traversing a molten zone along a bar of solid semiconductor material and results in the removal of impurities to the ends of the bar. The success of the process depends upon the value of the distribution co-efficient $k$ (sometimes called segregation constant) of impurities present in the semiconductor material. The distribution coefficient is defined as the ratio:

$$\frac{\text{Impurity concentration in the solid near a solid-liquid interface}}{\text{Impurity concentration in the liquid near a solid-liquid interface}}$$

Thus impurities with $k<1$ concentrate in the liquid zone and are moved along with the liquid zone. Impurities with $k$' s $>1$ move in the opposite direction. As a result the material is purified. For one widely-used semiconductor material, indium antimonide, the distribution coefficient for tellurium in it has been measured to be approximately 0.9. This means that there has been recognized and accepted a practical limit to the reduction by zone refining of the concentration of tellurium as an impurity in indium antimonide.

We have discovered, however, that the distribution coefficient $k$ depends on the orientation of the solid surface exposed to the liquid, relative to the crystallographic planes of the material. At practical rates of growth there is a marked difference between the coefficient $k$ when the solid at the interface exposes a plane of low crystallographic index (i.e. a plane of a crystal in which there is a high density of atoms) and when the solid does not expose a low index plane.

For example we have measured the coefficient $k$ of tellurium in indium antimonide when the index is low so that the interface is a (1, 1, 1) facet of the crystal, and we have found its value to be about 4. In contrast away from the (1, 1, 1) facet when the index is not low and the interface is a plane in which only a low atom density obtains the coefficient $k$ becomes only 0.5.

It seems reasonably clear that the previously-found value for the coefficient $k$ of 0.9 was obtained because the solid interface was polycrystalline i.e. the solid interface was not a single crystallographic plane but was made up of portions of planes of different orientation resulting in a weighted mean value of $k$ between 4 and 0.5 i.e. 0.9.

Accordingly our invention provides a process for the preparation of semiconductor material in which zone refining of the material is carried out by the steps of moving a molten zone in the material, and simultaneously controlling the liquid-solid interface so that a low value of the distribution coefficient $k$ is obtained for an impurity whose concentration it is desired to reduce.

Conveniently when idium antimonide is the basic semiconductor material it is first purified by the process we have described in our co-pending British patent application No. 40,398/57 (U.S. Serial No. 781,653, Canadian No. 764,760, German No. N 16,056, Dutch No. 234,619). The resulting material is then zone-refined using a seed crystal having its growth face orientated away from its man (1, 1, 1) facet so that during the zone refining process the material growing behind the molten zone is always a single crystal with the seed oriented to inhibit the formation of a (1, 1, 1) facet of the solid-liquid interface. Then tellurium, for example, its distribution coefficient effectively about 0.5, can readily be removed during the zone refining.

An example of an improved zone-refining process for indium antimonide will now be described with reference to the accompanying drawings in which.

Figure 1:
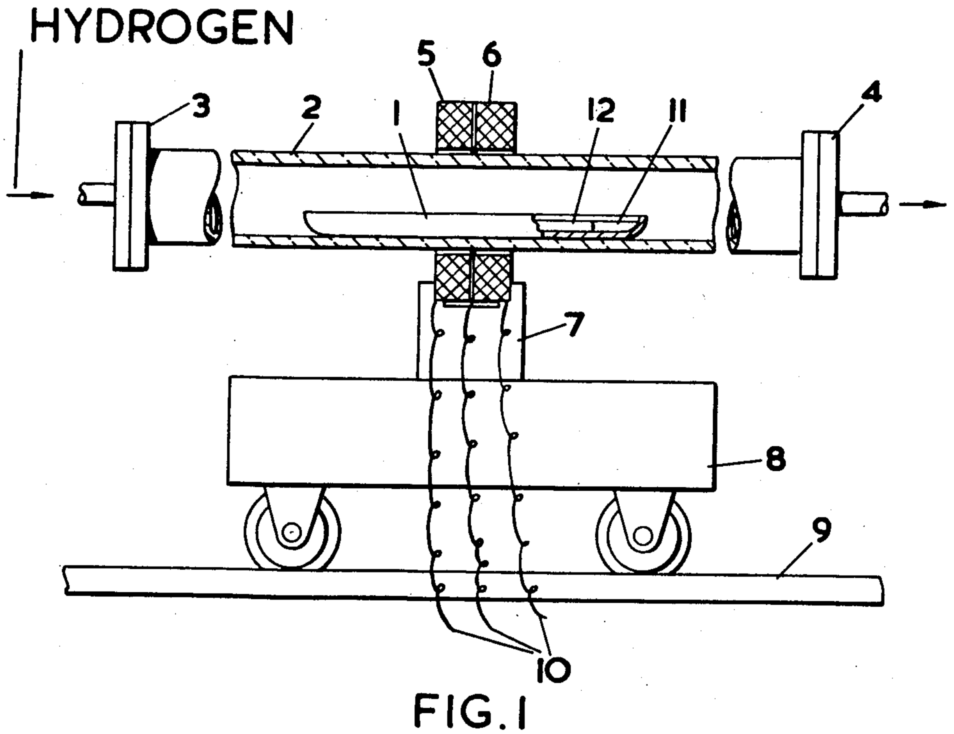
FIG. 1 shows an apparatus for carrying out a zone-refining process.
Figure 2:
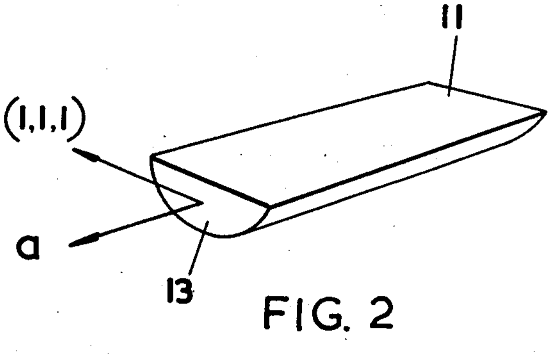
FIG. 2 shows a prepared seed crystal for use in zone-refining.

In the zone refining apparatus of FIG. 1 a crucible 1 is contained in a quartz tube 2; sealed ends 3 and 4 serve as inlet and outlet points for hydrogen gas which provides an inert atmosphere during operation. Two coils 5 and 6 are carried in a mounting 7 which is itself carried on a trolley 8. The trolley 8 runs on rails 9. The coils 5 and 6 which encircle the tube 2 are energized from suitable direct current sources via leads 10.

As so far described the apparatus represents a zone refining apparatus in which a bar 12 of semiconductor material to be refined is carried in the crucible 1. The coils 5 and 6 are energized so that a small length of the material in the crucible 1 is liquified and the trolley 8 moving along the rails 9 moves the liquid zone along the bar 12 of material.

A seed crystal 11 is shown in position at one end (the righthand) of the crucible 1 and in operation the main bar 12 of material in the crucible 1 is positioned so that the molten zone produced by the coils 5 and 6 can be moved along so as just to touch the seed crystal 11. Thereafter the coils 5 and 6 are moved to the left so that the molten zone moves from the seed crystal 11 slowly at the rate of about 1 cm. per hour. To take advantage of our discovery in this example, which we take to be the refining of a bar 12 of indium antimonide, the growth surface of the crystal 11 formed by the molten zone due to the coils 5 and 6 is orientated well away from the (1, 1, 1) facet. The distribution coefficient $k$ for tellurium in indium antimonide has an effective value of about 0.5 and for each traverse of the coils 5 and 6 some tellurium is removed to the left hand end of the bar 12.

The seed crystal 11 is prepared by cutting and grinding a piece of single crystal indium antimonide to fit the crucible 1, and at the same time so arranging the crystallographic orientation (by X-raying the specimens) that the direction of crystal growth is well away from a 1, 1, 1 direction (the 1, 1, 1 direction is that direction perpendicular to the 1, 1, 1 crystallographic plane or facet for the material). Thus when the seed crystal 11 is positioned in the crucible 1 its growth face 13 is orientated in the correct manner to ensure success in the subsequent zone refining operation.

The criterion for the orientation of the seed crystal is such that the solid at the solid liquid interface during the zone refining does not form a (1, 1, 1) facet anywhere on its surface. Practical considerations determine how near the 1, 1, 1 crystallographic plane may come to being tangential to the interface without difficulties arising, but generally adjustment of the energisation effected by the coils 5 and 6 are careful orientation of the seed crystal will ensure success.

A second method is possible. Whereas, in the process just described, the seed crystal and liquid-solid interface are controlled so as to ensure a low value of the distribution co-efficient *k* by choosing the orientation of the seed crystal to inhibit the formation of a 1, 1, 1 facet at the solid-liquid interface, in the second method arrangements are made so that the solid presents a concave shape to the liquid at the solid-liquid interface.

This contrasts with the flat or convex shapes adopted hitherto by others.

The second method is conveniently carried out using the apparatus of FIG. 1 of the drawings. The leads 10 are connected to suitable current control devices (not shown) so that the thermal heating due to the coils 5 and 6 is effective to establish a concave interface between solid and liquid in the bar 12 of semiconductor material in the crucible 1. Operation then follows as previously described, no special orientation of the seed crystal being necessary.

The establishment of the concave interface will be readily achieved by those skilled in the art. Consideration of the heat flow from the coils 5 and 6 into the bar 12, along the bar 12 and out again further along it shows that isothermal surfaces are orthogonal to the lines of heat flow. The heat flow is generally along the bar in the molten zone tending to spread outwards at a distance from the heaters. Where the lines of flow spread outwards into the atmosphere surrounding the bar, the inside of the bar tends to remain hotter than the outside; the isothermal surfaces are concave and hence, if the temperature is such that the solid-liquid interface is formed there, the interface also is concave.

This second method has an advantage; in certain circumstances a single crystal being grown by the first method suddenly twins (i.e. so called twinning commences). In the second method twinning is inhibited by the concave solid-liquid interface.

The examples described above relate to indium antimonide but it is expected that other semiconductor materials, in particular compound semiconductor materials, may also be processed so that either greater purity is obtained or certain desired and pre-determined impurity concentrations are achieved. For example gallium arsenide may be suitable.

What we claim is:

1. A process for the preparation of single crystals of semiconductor binary compounds which consist of one each of Group III and Group V elements by zone refining in which a molten zone is moved in a given crystal-growing direction through an elongated mass of the material, the crystal-growing direction being along the longitudinal axis of said elongated mass, with crystal-growth taking place along said direction as the molten zone passes, said process comprising the steps of orienting a seed crystal so that its 1, 1, 1 direction lies obliquely to said crystal-growing direction, raising the temperature to above the melting point of a zone of said mass with a heater and thereby establishing a molten zone in said mass in contact with said seed crystal, and zone refining by establishing relative movement between said mass and said heater along said crystal-growing direction.

2. A process as set forth in claim 1 including the steps of forming a growth face on said seed crystal which is oblique to a direction normal to a 1, 1, 1 facet of said seed crystal and locating the crystal in contact with said mass so that the growth face of the crystal is transverse to said crystal-growing direction.

3. A process as set forth in claim 1 in which said compound is indium antimonide.

4. A process as set forth in claim 1 in which said compound is gallium arsenide.

References Cited in the file of this patent

UNITED STATES PATENTS

| | | |
|---|---|---|
| 2,813,048 | Pfann | Nov. 12, 1957 |
| 2,829,994 | Stello | Apr. 8, 1958 |
| 3,031,403 | Bennett | Apr. 24, 1962 |

OTHER REFERENCES

Barrett: Structure of Metals, 2nd ed., McGraw-Hill Book Co. Inc., New York, 1952, pages 8 and 9.

Bolling et al.: Growth Twins in Germanium, Canadian Journal of Physics, vol. 34, January-June 1956, pages 234–240.